(12) United States Patent
Malinowski et al.

(10) Patent No.: US 12,391,088 B2
(45) Date of Patent: Aug. 19, 2025

(54) INSTANT SUSPENSION MODE DIFFERENTIATION

(71) Applicant: Rivian IP Holdings, LLC, Plymouth, MI (US)

(72) Inventors: Jacob Malinowski, Laguna Niguel, CA (US); David Steven Mayes Houser, Costa Mesa, CA (US); Maxwell Koff, Newport Beach, CA (US); Dante Ashok Leo Khandelwal, Carlsbad, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 225 days.

(21) Appl. No.: 18/128,612

(22) Filed: Mar. 30, 2023

(65) Prior Publication Data

US 2024/0198752 A1 Jun. 20, 2024

Related U.S. Application Data

(60) Provisional application No. 63/433,367, filed on Dec. 16, 2022.

(51) Int. Cl.
| | |
|---|---|
| *B60G 17/018* | (2006.01) |
| *B60K 23/04* | (2006.01) |
| *B60K 26/02* | (2006.01) |
| *B60W 30/182* | (2020.01) |
| *B62D 6/00* | (2006.01) |

(52) U.S. Cl.
CPC ............ *B60G 17/018* (2013.01); *B60K 23/04* (2013.01); *B60K 26/021* (2013.01); *B60T 2220/06* (2013.01); *B60W 30/182* (2013.01); *B62D 6/007* (2013.01); *B62D 6/008* (2013.01)

(58) Field of Classification Search
CPC .... B60G 17/018; B60K 23/04; B60K 26/021; B60T 2220/26; B60W 30/182; B62D 6/007; B62D 6/008
See application file for complete search history.

(56) References Cited

U.S. PATENT DOCUMENTS

2017/0158015 A1\* 6/2017 Kubota ................ B60G 17/018

FOREIGN PATENT DOCUMENTS

| DE | 102008053004 A1 | 10/2009 | |
|---|---|---|---|
| EP | 1845010 A2 \* | 10/2007 | ............... B60T 7/06 |
| JP | 2020132122 A \* | 8/2020 | |

OTHER PUBLICATIONS

Gruendinger, EP 1845010, machine translation. (Year: 2007).\*
Okada, JP 2020-132122, machine translation. (Year: 2020).\*

\* cited by examiner

*Primary Examiner* — Mark L. Greene
(74) *Attorney, Agent, or Firm* — Haley Guiliano LLP

(57) ABSTRACT

Systems and methods are provided to enable a user of a vehicle to perceive instant suspension mode differentiation. An instruction is generated to change generating an instruction to change from a first vehicle setting to a second vehicle setting. The first vehicle setting comprises a first parameter value and the second vehicle setting comprises a second parameter value. In response to the instruction, an elevated change is applied to the first vehicle parameter during an initial period. A reduced elevated change is applied to the second parameter during a subsequent period.

16 Claims, 6 Drawing Sheets

INSTANT SUSPENSION MODE DIFFERENTIATION

CROSS-REFERENCE TO RELATED APPLICATIONS

This application claims the benefit of U.S. Provisional Patent Application No. 63/433,367 filed Dec. 16, 2022, the disclosure of which is hereby incorporated by reference herein in its entirety.

INTRODUCTION

The present disclosure is directed to providing a perceivable change to a user of a vehicle when an operating state of the vehicle is modified.

SUMMARY

The present disclosure is directed to systems and methods for providing a user with a perceivable modification of vehicle modes instantaneously, and more particularly, to systems and methods that apply an elevated change to a vehicle parameter in response to an instruction to change from a first vehicle setting to a second vehicle setting. In some embodiments, a vehicle includes an option to modify suspension modes between an option having reduced damping and an option having increased damping (e.g., a nominal suspension setting and a sport suspension setting corresponding to a stiffer operating state for the suspension). A user may select an option or provide an input to change from a first vehicle setting to second vehicle setting (e.g., changing from the nominal suspension setting to the sport suspension setting). An instruction to change from the first vehicle setting to the setting vehicle setting is generated. The first vehicle setting comprises a first parameter value and the second vehicle setting comprises a second parameter value (e.g., the first parameter value may correspond to a nominal or baseline current provided to a solenoid in a damper for nominal suspension responses and the second parameter value may corresponds to an elevated current provided to the solenoid in the damper in order to allow the user of the vehicle to perceive a change in the suspension settings). In response to the instruction, the elevated change is applied to the first vehicle parameter during an initial period. The elevated change is reduced to apply the second parameter value during a subsequent period.

In some embodiments, the instruction is generated in response to a user selecting to change a drive mode to a sport mode. For example, the sport mode may result in a modification of one or more of a steering feel setting, a suspension damper setting, a brake pedal sensitivity, and an accelerator pedal sensitivity.

In some embodiments, the first and second vehicle settings comprise damper stiffness settings. The second vehicle setting corresponds to higher damper stiffness than the first vehicle setting. The first and second parameter values may each correspond to a baseline current for an active damper. The active damper may comprise a solenoid controlled damper. Additionally, or alternatively, the damper may comprise any components configured to modify operation in response to control signals which provide varying magnitudes of inputs to control the operating state of the damper. In some embodiments, a dynamic current for the active damper is determined. The higher of the baseline current and the active current is selected to apply to the active damper.

In some embodiments, the initial period is less than 10 seconds. The elevated change may be 25 to 300 percent greater than a difference between the first vehicle setting and the second vehicle setting.

In some embodiments, the disclosure is directed to a vehicle system comprising a vehicle module configured to modify operation of a vehicle based on vehicle settings comprised of parameters and processing circuitry communicatively coupled to the vehicle module, wherein the processing circuitry is configured to execute various embodiments of the method described herein.

BRIEF DESCRIPTION OF THE FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

The present disclosure is directed to systems and methods for providing a user with a perceivable modification of vehicle modes instantaneously, and more particularly, to systems and methods that apply an elevated change to a vehicle parameter in response to an instruction to change from a first vehicle setting to a second vehicle setting.

In the examples herein, a suspension mode differentiation is made perceivable to the user based on a modification of current supplied to a solenoid controlling a damper assembly. However, examples herein may be applied without limitation to other modules, apparatuses, systems, and assemblies within a vehicle which may have parameters modified to create a perceivable change for the user after selecting different modes. Example systems and methods herein may also be directed to adjusting steering feel, pedal sensitivity, and various rates of vehicle suspension response to road conditions, merely as examples.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, CD, media cards, register memory, processor caches, Random Access Memory (RAM), etc.

Figure 1:
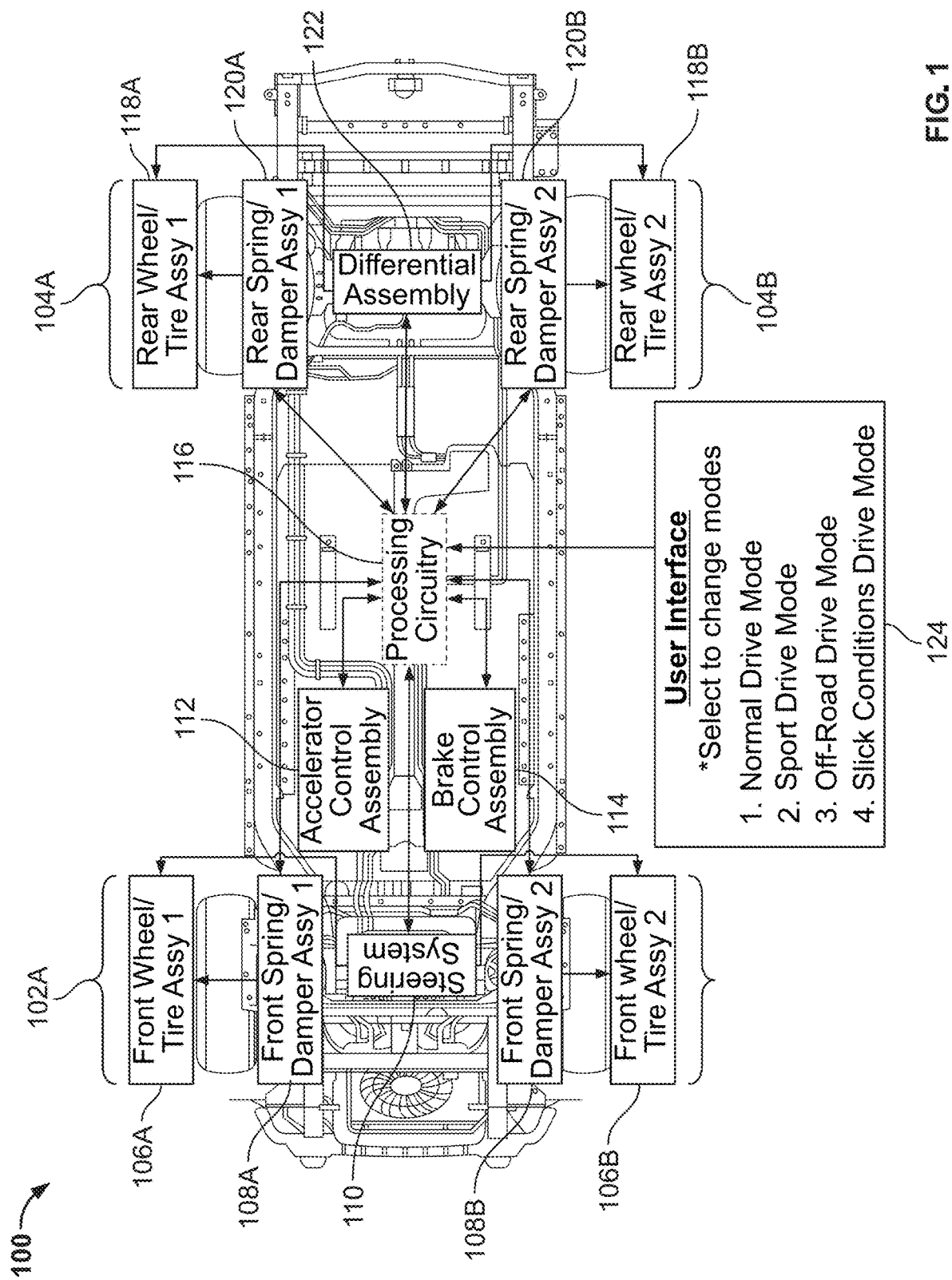
FIG. 1 is a top view of a vehicle system configured to modify operating states of different systems and assemblies, in accordance with some embodiments of the disclosure.

FIG. 1 is a top view of vehicle system 100 which is configured to modify operating states, or vehicle modes, based on an input, in accordance with some embodiments of the disclosure. Vehicle system 100 may incorporate, in whole or in part, the various assemblies and elements depicted in FIGS. 2A-2D and 5. Vehicle system 100 may utilize one or more of the graphs of FIG. 3 as a control signal for modifying a vehicle operating state or a vehicle mode. Vehicle system 100 may be configured to execute one or more of the steps depicted in FIG. 4.

Vehicle system 100 is comprised of front vehicle corners 102A and 102B as well as rear vehicle corners 104A and 104B. Front vehicle corner 102A is comprised of front wheel/tire assembly 106A and front spring damper assembly 108A. Front vehicle corner 102B is comprised of front wheel/tire assembly 106B and front spring damper assembly 108B. Front wheel/tire assembly 106A and front wheel/tire assembly 106B are coupled to front spring damper assembly 108A and front spring damper assembly 108B, respectively, using one or more of a bushing, a linkage, a joint, or a fastener. Front spring/damper assemblies 108A and 108B are configured to independently control one or more of a rate or magnitude of jounce and rebound along a plurality of axes of motion of each of front wheel/tire assemblies 106A and 106B. For example, a spring element (e.g., one or more of a strut or shock) of each of front spring/damper assemblies 108A and 108B may be configured to return a vehicle suspension coupled to front wheel/tire assemblies 106A and 106B to a ride height after experiencing compression of the spring element. In another example, a damper element (e.g., one or more of a solenoid controlled damper assembly or a hydraulic damper) of each of front spring/damper assemblies 108A and 108B may be configured to reduce the rate of jounce and rebound of one or more of suspension components coupled together at or around front vehicle corners 102A and 102B. Each of front wheel/tire assemblies 106A and 106B are coupled by one or more linkages, joints, or bushings to steering system 110. Steering system 110 comprises a linkage to translate steering wheel inputs from a vehicle user to road wheel angles corresponding to orientations of front wheel/tire assemblies 106A and 106B. Each of front spring/damper assemblies 108A and 108B as well as steering system 110 are communicatively coupled to processing circuitry 116. Processing circuitry 116 is also communicatively coupled to one or more of brake control assembly 114 and accelerator control assembly 112.

Rear vehicle corner 104A is comprised of rear wheel/tire assembly 118A and rear spring damper assembly 120A. Rear vehicle corner 104B is comprised of rear wheel/tire assembly 118B and rear spring damper assembly 120B. Rear wheel/tire assembly 118A and rear wheel/tire assembly 118B are coupled to rear spring damper assembly 120A and rear spring damper assembly 120B, respectively, using one or more of a bushing, a linkage, a joint, or a fastener. Rear spring/damper assemblies 120A and 120B are configured to independently control one or more of a rate or magnitude of jounce and rebound along a plurality of axes of motion of each of rear wheel/tire assemblies 118A and 118B. For example, a spring element (e.g., one or more of a strut or shock) of each of rear spring/damper assemblies 120A and 120B may be configured to return a vehicle suspension coupled to rear wheel/tire assemblies 118A and 118B to a ride height after experiencing compression of the spring element. In another example, a damper element (e.g., one or more of a solenoid controlled damper assembly or a hydraulic damper) of each of rear spring/damper assemblies 120A and 120B may be configured to reduce the rate of jounce and rebound of one or more of suspension components coupled together at or around rear vehicle corners 104A and 104B.

Each of rear wheel/tire assemblies 106A and 106B are coupled by one or more linkages, joints, or bushings to differential assembly 122. In some embodiments, differential assembly 122 may interface with a second steering system for each of rear wheel/tire assemblies 118A and 118B. Differential assembly 122 is configured to control rotational motion of rear wheel/tire assemblies 118A and 188B. Differential assembly 122 is not required for all vehicle assemblies. For example, certain vehicle assemblies may rely on independent actuation of a front wheel pair and a rear wheel pair such that each wheel pair, or each individual wheel, is controlled by an individual motor. Different drive or vehicle modes may result in different levels of control for each motor and, by extension, each wheel. In some embodiments, differential assembly 122 may be configured to control motion of rear wheel/tire assemblies 118A and 118B independently. Each of rear spring/damper assemblies 120A and 120B as well as differential assembly 122 are communicatively coupled to processing circuitry 116.

Processing circuitry 116 is depicted as a central vehicle processing unit in FIG. 1. In some embodiments, processing circuitry 116 may be integrated into one or more vehicle modules (e.g., a module corresponding to one or more of front spring/damper assemblies 108A and 108B, rear spring/damper assemblies 120A and 120B, steering system 110, accelerator control assembly 112, brake control assembly 114, or differential assembly 122). Processing circuitry 116 is configured to process and execute instructions corresponding to a non-transitory computer readable medium comprised of computer readable instructions in order to monitor, regulate, and modify various vehicle modes or vehicle operating states. Processing circuitry 116 may also correspond to a vehicle communication network with various control algorithms enabled for different systems and apparatuses throughout the vehicle to control motion of the vehicle and other operating states. As shown in FIG. 1, user interface 124 provides a means for a user to provide direct inputs to processing circuitry 116. For example, a user may interact with user interface 124 to change a drive mode (e.g., change from "Nominal Drive Mode" to "Sport Drive Mode"). Each of the drive modes depicted in FIG. 1 correspond to different control settings for one or more of front spring/damper assemblies 108A and 108B, steering system 110, brake control assembly 114, accelerator control assembly 112, or rear spring/damper assemblies 120A and 120B. For example, "Nominal Drive Mode" may be preferred for commuting and corresponds to a vehicle mode having increased driver comfort while decreasing road feedback. "Sport Drive Mode" may be preferred for track driving or extended highway driving to increase road feedback while also increasing responsiveness of various components of vehicles system 100. "Off-Road Drive Mode" may be used for trail driving or driving on roads with inconsistent or missing pavement. "Slick Conditions Drive Mode" may be used when one or more of rain, snow, or ice are prevalent along route and may improve a driver's control of each of front vehicle corners 102A and 102B as well as rear vehicle corners 104A and 104B.

In one example, a change from "Nominal Drive Mode" to "Sport Drive Mode" may increase the damping rate of one or more of front spring/damper assemblies 108A and 108B or rear spring/damper assemblies 120A and 120B. Additionally, the sensitivity of brake control assembly 114 and accelerator control assembly 112 may be increased while steering system 110 increases the effort of the driver to modify the road wheel angles of front wheel/tire assembly 106A and 106B. In some embodiments, differential assembly 122 may have an operating state modified to engage or disengage one or more of front wheel/tire assemblies 106A and 106B or rear wheel/tire assemblies 118A and 118B.

Figure 3:
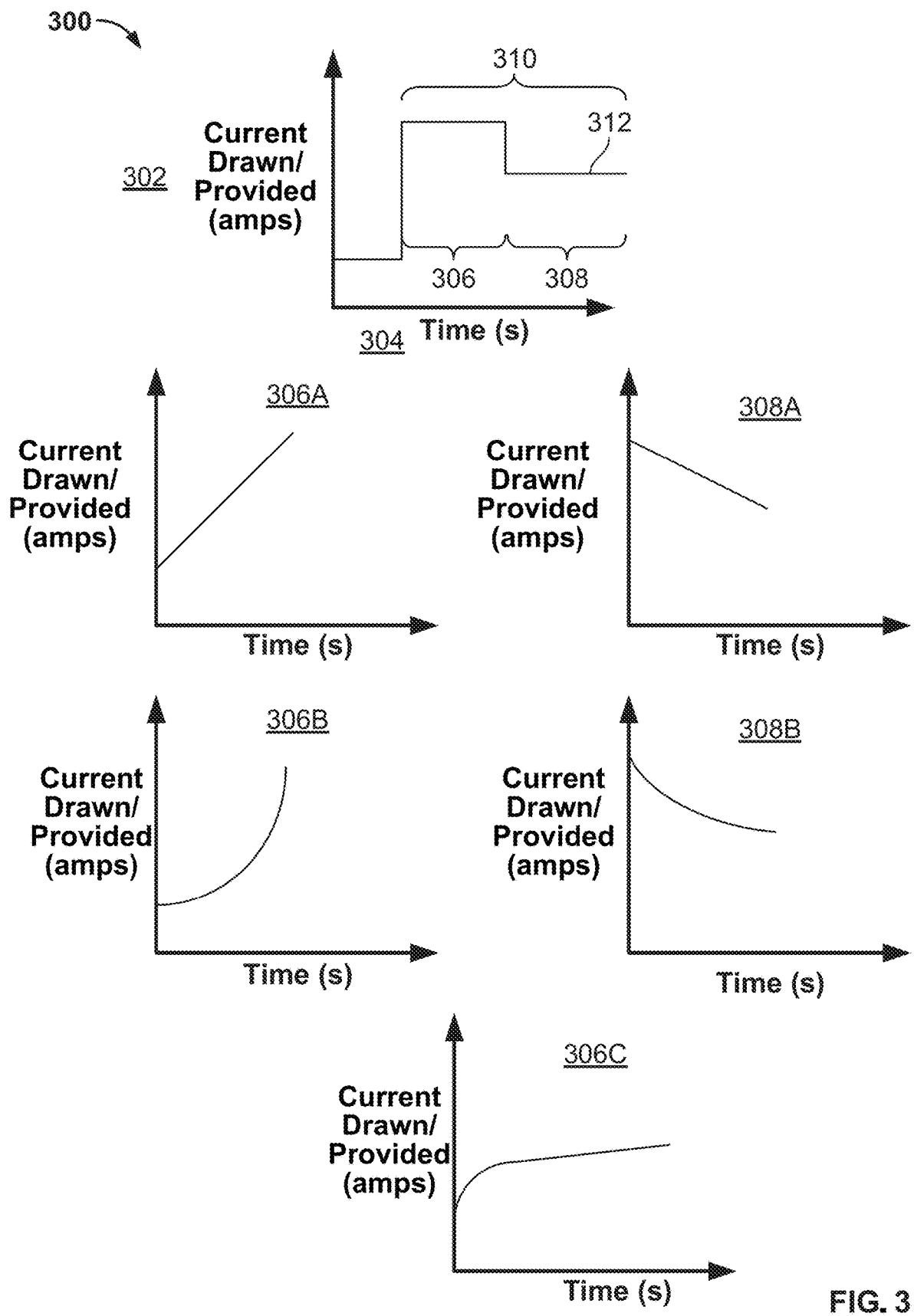
FIG. 3 provides a number of exemplary graphs characterizing how vehicle parameter values are changed during an initial period and subsequent period, in accordance with some embodiments of the disclosure.
Figure 4:
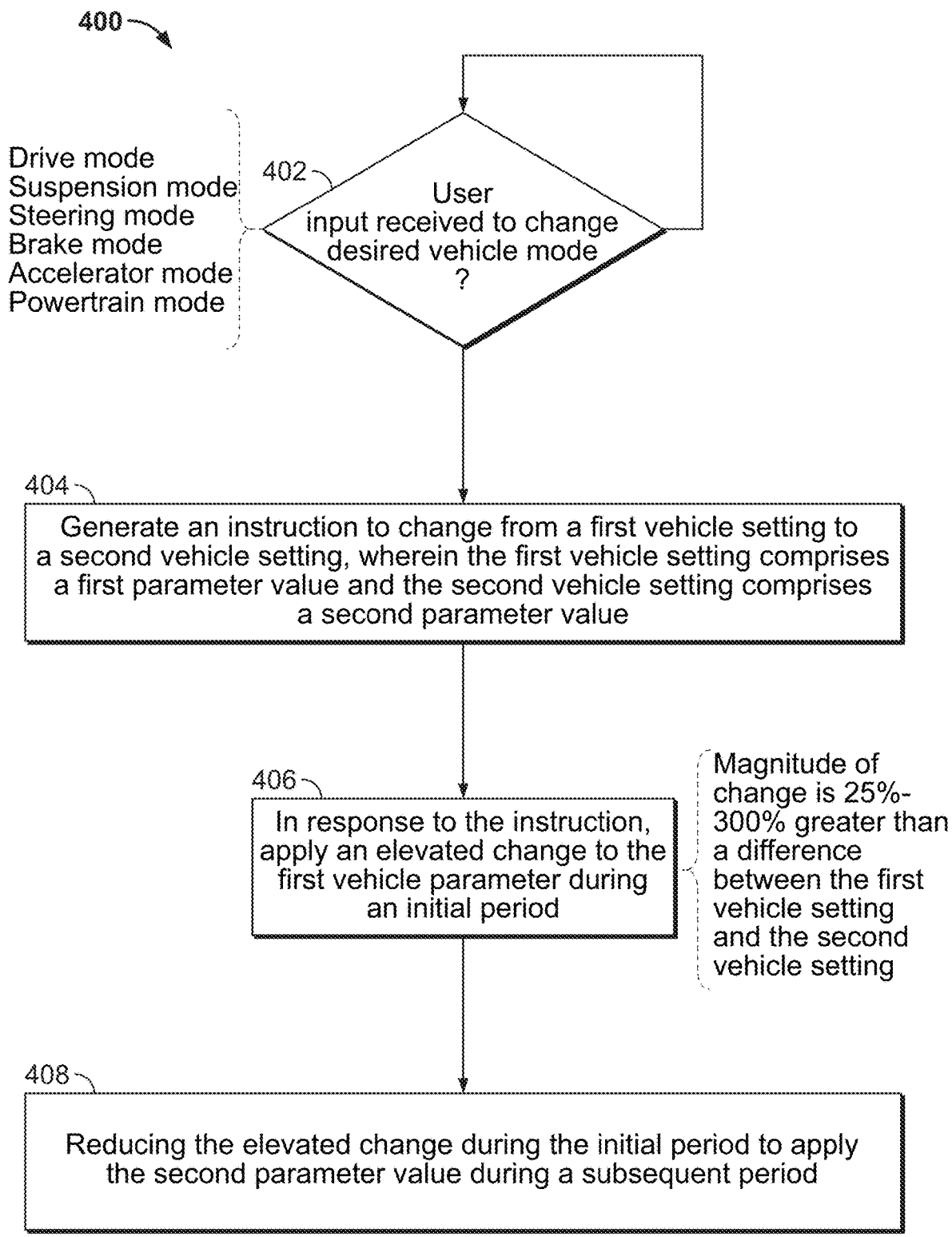
FIG. 4 is flow chart of a method for changing from a first vehicle setting to a second vehicle setting, in accordance with some embodiments of the disclosure.

Vehicle system 100 is configured to execute one or more steps of method 400 of FIG. 4. For example, a user may provide an input via user interface 124 which results in processing circuitry 116 generating an instruction to change from a first vehicle setting to a second vehicle setting in one or more of front spring damper assemblies 108A and 108B or rear spring damper assemblies 120A and 120B. Any or all of the assemblies may have states modified independently or simultaneously. The instructions causing the change of vehicle settings (e.g., by requesting a change in a vehicle mode or operating state via user interface 124) may include instructions to modify one or more parameter values. For example, one or more of front spring damper assemblies 108A and 108B or rear spring damper assemblies 120A and 120B may have modified operating states based on an amount of current provided to each respective assembly. A baseline amount of current supplied to the assemblies during "Nominal Drive Mode" may be about 0.4 amps per vehicle corner while the baseline amount of current supplied during "Sport Drive Mode" may be about 0.6 amps. Depending on the damping required for each vehicle corner (e.g., due to driving conditions), up to 1.6 amps may be supplied to each vehicle corner to improve the ride for the user depending on the actual dampers installed (e.g., some dampers may require or may be able to process more than 1.6 amps) as well as the actual road feedback experienced by vehicle system 100 (e.g., more current may be supplied for responding to pot hole events than may be supplied for traversing a speed bump). FIG. 3 provides detailed examples of how parameters (e.g., current) may be modified in response to a change in vehicle mode based on a user input. The change in parameters result in different damper stiffness settings, which are characterized by the plots of FIG. 3.

In some embodiments, the elevated change may not be immediately or adequately perceived by the user of vehicle system 100. As a result, the user may provide a repeat input indicating a second selection of a same drive mode (e.g., by providing a subsequent input to user interface 124 selecting a drive mode vehicle system 100 has already changed to). For example, the user may have started in "Nominal Drive Mode" and selected "Sport Drive Mode" leading to the elevated change being applied to one or more components of vehicle system 100. The user may expect a certain level of feedback from vehicle system 100 and may not feel the anticipated level of feedback due to one or more of driving conditions, current maneuvers being executed, or various road feedback experienced by vehicle 100. To confirm vehicle system 100 has changed to "Sport Drive Mode," the user may reselect the option of "Sport Drive Mode" via user interface 124. Despite this selection not resulting in a change in a drive mode and instead serves as a reaffirmation to the user that vehicle system 100 has changed to a new current drive mode, the elevated change is reapplied to enable the user a second chance to perceive the feedback confirming the vehicle is in "Sport Drive Mode." The elevated change may be scaled based on a new baseline value or a preceding baseline level of parameters. The elevated change may be applied in response to any number of selections of a drive mode, whether it requires a change of drive mode or just a confirmation of vehicle system 100 being in a current drive mode.

Figure 2A:
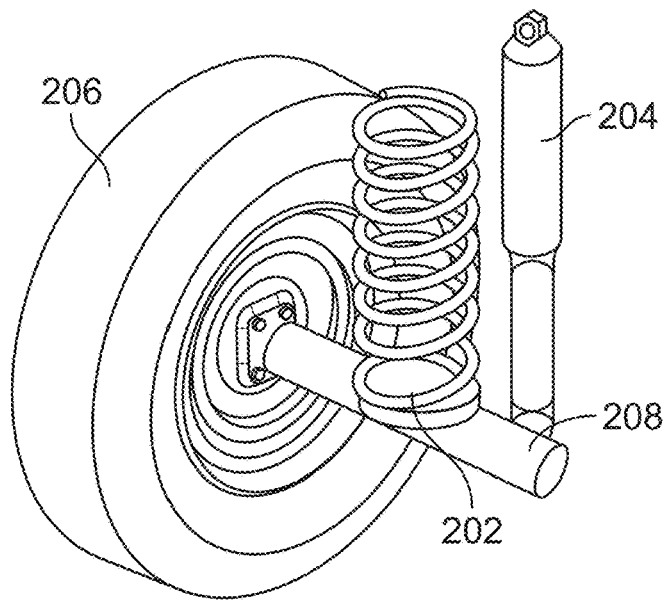
FIG. 2A is an angled view of a spring and damper assembly coupled to a wheel and tire assembly, in accordance with some embodiments of the disclosure.

FIG. 2A depicts spring/damper assembly 200A, in accordance with some embodiments of the disclosure. Spring/damper assembly 200A may incorporate, in whole or in part, the various assemblies and elements depicted in FIGS. 1, 2B-2D and 5. Spring/damper assembly 200A may have operational conditions modified based on a control signal corresponding to one or more of the graphs of FIG. 3 in response to an instruction to modify a vehicle operating state or a vehicle mode. Spring/damper assembly 200A may be configured to execute one or more of the steps depicted in FIG. 4 in response to instructions received from processing circuitry (e.g., processing circuitry 116 of FIG. 1). Spring/damper assembly 200A may be used, in whole or in part, as an element of one or more of front spring/damper assemblies 108A and 108B or rear spring/damper assemblies 120A and 120B of FIG. 1.

Spring/damper assembly 200A is comprised of coil spring 202 and damper 204. Each of coil spring 202 and damper 204 are coupled to wheel/tire assembly 206. Coil spring 202 is configured to return wheel/tire assembly 206 to a nominal ride height after experiencing one or more of a jounce event or a rebound event. Damper 204 is configured to reduce a rate at which wheel/tire assembly accelerates along one or more axes in response to a jounce event or a rebound event. As shown in FIG. 2A, coil spring 202 and damper 204 are arranged separately along linkage 208. One or more of coil spring 202 and damper 204 may have modifiable parameters which are controlled based on instructions generated by processing circuitry 116 of FIG. 1 (e.g., one or more of current provided, spring rates, or damping rates may be modified in one or more of coil spring 202 or damper 204 in response to an instruction to change a vehicle mode).

Figure 2B:
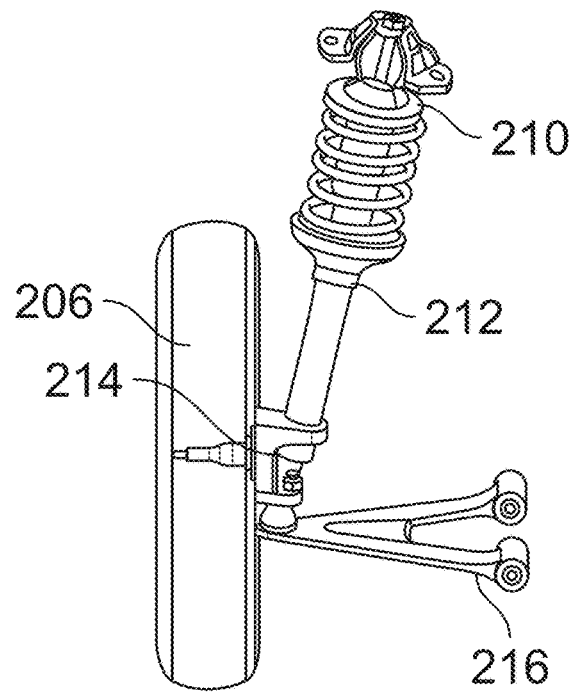
FIG. 2B is an angled view of an integrated spring and damper assembly coupled to a wheel and tire assembly, in accordance with some embodiments of the disclosure.

FIG. 2B depicts spring/damper assembly 200B, in accordance with some embodiments of the disclosure. Spring/damper assembly 200B may incorporate, in whole or in part, the various assemblies and elements depicted in FIGS. 1, 2A, 2C, 2D and 5. Spring/damper assembly 200B may have operational conditions modified based on a control signal corresponding to one or more of the graphs of FIG. 3 in response to an instruction to modify a vehicle operating state or a vehicle mode. Spring/damper assembly 200A may be configured to execute one or more of the steps depicted in FIG. 4 in response to instructions received from processing circuitry (e.g., processing circuitry 116 of FIG. 1). Spring/damper assembly 200B may be used, in whole or in part, as an element of one or more of front spring/damper assemblies 108A and 108B or rear spring/damper assemblies 120A and 120B of FIG. 1.

Spring/damper assembly 200B is comprised of concentric coil spring 210 and damper 212. Both of concentric coil spring 210 and damper 212 are coupled to wheel/tire assembly 206 at suspension joint 214. Concentric coil spring 210 is configured to return wheel/tire assembly to a nominal ride height after experiencing one or more of a jounce event or a rebound event. Damper 210 is configured to reduce a rate at which wheel/tire assembly 206 accelerates along one or more axes in response to a jounce event or a rebound event. As shown in FIG. 2B, coil spring 202 and damper 204 are coupled to wheel/tire assembly 206 at converging connection shared with lower control arm 216. The converging connection may be a portion of a knuckle or other suspension portion configured to connect various aspects of a vehicle assembly to wheel/tire assembly 206. One or more of concentric coil spring 210 and damper 212 may have modifiable parameters which are controlled based on instructions generated by processing circuitry 116 of FIG. 1 (e.g., one or more of current provided, spring rates, or damping rates may be modified in one or more of concentric coil spring 210 or damper 212 in response to an instruction to change a vehicle mode).

Figure 2C:
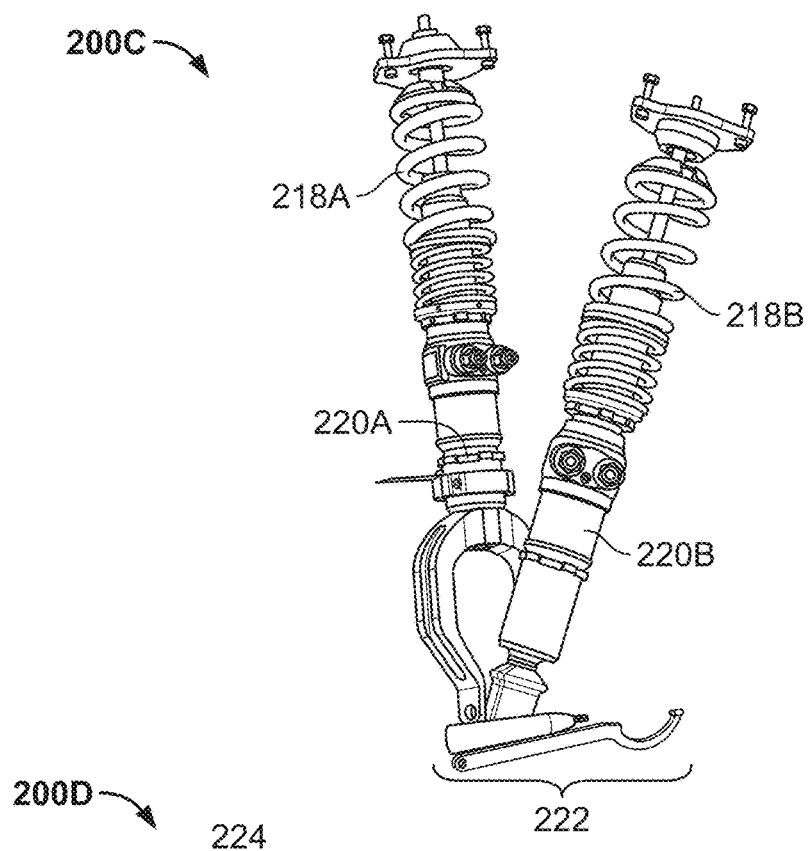
FIG. 2C is an integrated dual spring and dual damper assembly, in accordance with some embodiments of the disclosure.

FIG. 2C depicts dual spring/dual damper assembly 200C, in accordance with some embodiments of the disclosure. Dual spring/damper assembly 200C may incorporate, in whole or in part, the various assemblies and elements depicted in FIGS. 1, 2A, 2B, 2D and 5. Dual spring/damper assembly 200C may have operational conditions modified based on a control signal corresponding to one or more of the graphs of FIG. 3 in response to an instruction to modify a vehicle operating state or a vehicle mode. Dual spring/damper assembly 200C may be configured to execute one or more of the steps depicted in FIG. 4 in response to instructions received from processing circuitry (e.g., processing circuitry 116 of FIG. 1). Dual spring/damper assembly 200C may be used, in whole or in part, as an element of one or more of front spring/damper assemblies 108A and 108B or rear spring/damper assemblies 120A and 120B of FIG. 1.

Dual spring/damper assembly 200C is comprised of a pair of concentric coil springs 218A and 218B arranged to interface with dampers 220A and 220B, respectively. Dual spring/damper assembly 200C may be coupled to wheel/tire assembly 206 by a knuckle or other suspension portion configured to connect various aspects of a vehicle assembly to wheel/tire assembly 206 at coupling joint 222. Both of concentric coil springs 218A and 281B are configured to return wheel/tire assembly to a nominal ride height after experiencing one or more of a jounce event or a rebound event by providing a stabilizing return force along difference axes, depending on an installation orientation in a vehicle corner. For example, one of coil springs 218A and 281B may stabilize motion along a horizontal axis while the other may stabilize motion along a vertical axis. Dampers 220A and 200B are configured to reduce a rate at which a wheel/tire assembly coupled at coupling joint 222 accelerates along one or more axes in response to a jounce event or a rebound event. One or more of concentric coil spring 218A and 218B or dampers 220A and 220B may have modifiable parameters which are controlled based on instructions generated by processing circuitry 116 of FIG. 1 (e.g., one or more of current provided, spring rates, or damping rates may be modified in one or more of concentric coil spring 218A and 218B or dampers 220A and 220B in response to an instruction to change a vehicle mode).

Figure 2D:
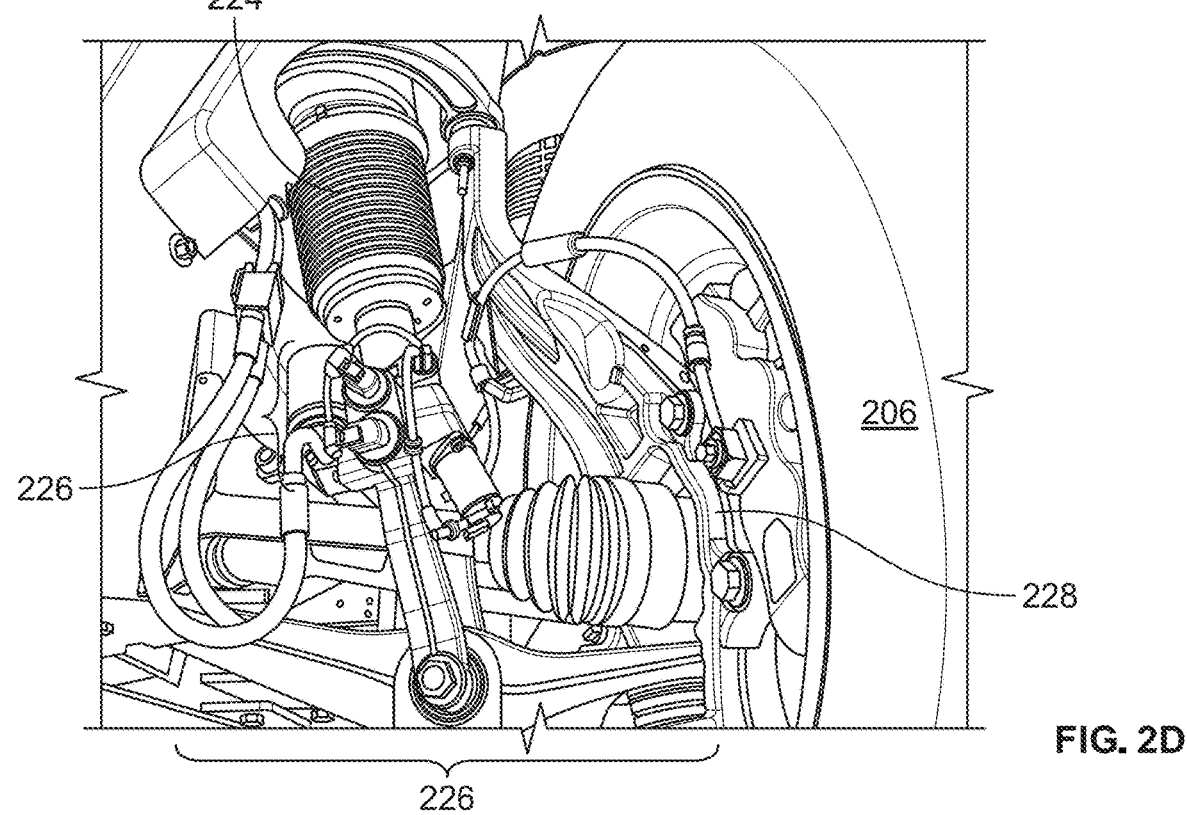
FIG. 2D is an angled view of an external reservoir spring and damper assembly coupled to a wheel and tires assembly, in accordance with some embodiments of the disclosure.

FIG. 2D depicts external reservoir spring/damper assembly 200D, in accordance with some embodiments of the disclosure. External reservoir spring/damper assembly 200D may incorporate, in whole or in part, the various assemblies and elements depicted in FIGS. 1, 2A-2C and 5. External reservoir spring/damper assembly 200D may have operational conditions modified based on a control signal corresponding to one or more of the graphs of FIG. 3 in response to an instruction to modify a vehicle operating state or a vehicle mode. External reservoir spring/damper assembly 200D may be configured to execute one or more of the steps depicted in FIG. 4 in response to instructions received from processing circuitry (e.g., processing circuitry 116 of FIG. 1). External reservoir spring/damper assembly 200D may be used, in whole or in part, as an element of one or more of front spring/damper assemblies 108A and 108B or rear spring/damper assemblies 120A and 120B of FIG. 1.

External reservoir spring/damper assembly 200D is comprised of concentric coil spring 224 and external reservoir damper 226. External reservoir spring/damper assembly 200D is coupled to wheel/tire assembly 206 by knuckle 228. In some embodiments, a different suspension portion or element is configured to connect various aspects of a vehicle assembly to wheel/tire assembly 206. Concentric coil spring 224 is configured to return wheel/tire assembly to a nominal ride height after experiencing one or more of a jounce event or a rebound event by providing a stabilizing return force along difference axes, depending on an installation orientation in a vehicle corner. External reservoir damper 226 is configured to reduce a rate at which wheel/tire assembly 206 accelerates along one or more axes in response to a jounce event or a rebound event. One or more of concentric coil spring 224 or external reservoir damper 226 may have modifiable parameters which are controlled based on instructions generated by processing circuitry 116 of FIG. 1 (e.g., one or more of current provided, spring rates, or damping rates may be modified in one or more of concentric coil spring 224 or external reservoir damper 226 in response to an instruction to change a vehicle mode).

FIG. 3 depicts graph 300 which characterizes how one or more vehicle parameter values are changed during initial period 306 and subsequent period 308, in accordance with some embodiments of the disclosure. Initial period 306 and subsequent period 308 together form control period 310, during which instructions are provided to modify one or more parameters of one or more modules controlling various vehicle subsystems (e.g., dampers in a suspension assembly). Graph 300 may have initial period 306 modified to include one or more controller profiles corresponding to one or more of beginning profiles 306A-306C, depending on how a control algorithm is applied to the systems and method of the present disclosure. Graph 300 may have subsequent portion 308 modified to include one or more controller profiles corresponding to one or more of ending profiles 308A or 308B, depending on how a control algorithm is applied to the systems and method of the present disclosure. Graph 300 correspond to a control signal profile that is used to affect, in whole or in part, the various assemblies and elements depicted in FIGS. 1, 2A-2D and 5. Graph 300 may represent a control signal generated in response to the execution of one or more of the steps depicted in FIG. 4 (e.g., as executed by processing circuitry 116 of FIG. 1).

Graph 300 depicts a step function for modifying an amount of current drawn or provided over time to one or more modules, systems, apparatuses, or vehicle corners shown in one or more of FIGS. 1, 2A-2D, and 5. Axis 302 corresponds to a parameter value that is modified in response to an instruction to change a vehicle setting. For example, a first vehicle setting may correspond to a first parameter value while a second vehicle setting may correspond to an elevated change to the first parameter value resulting in a second parameter value (e.g., current drawn by a damper assembly or current provided to a damper assembly). Axis 304 corresponds to a change in the parameter over time such that the control signal generated to apply the elevated change to the parameter occurs during initial period 306. As shown in graph 300, parameter change profile 312 (e.g., as a representation over time of a control signal being applied to change a parameter value in response to an instruction to change from a first vehicle setting to a second vehicle setting) is represented by a step function. In some embodiments, parameter change profile 312 may be generated using one or more of a step function, a linear function, an exponential function, a logarithmic function, a trigonometric function, or a root function.

Parameter change profile 312 is characterized by initial period 306, control period 310, and subsequent period 308. Initial period 306 corresponds to a period where an elevated change to the vehicle parameter of axis 302 is applied (e.g., a change that is 25% to 300% greater than a difference between the parameter value corresponding to the first vehicle setting and the parameter value corresponding to the second vehicle setting). The elevated change may be applied using one or more of beginning profiles 306A-306C. Beginning profile 306A corresponds to a linear function. Beginning profile 306B corresponds to one or more of an exponential function or a portion of a trigonometric function. Beginning profile 306C corresponds to one or more of a logarithmic function or a root function. Subsequent period 308 corresponds to a period where the elevated change applied to the parameter during initial period 306 is reduced. Subsequent period 308 commences upon the conclusion of control period 310. Control period 310 may be up to 10 seconds and in some embodiments may be more than 10 seconds, depending on how long is required to provide a perceptive change to a user of the vehicle. The reduced elevated change to the parameter may be applied using one or more of ending profiles 308A or 308B. Ending profile 308A corresponds to a linear decay in the parameter magnitude. Ending profile 308B corresponds to one or more of a logarithmic decay, a portion of a trigonometric decay, or a root function decay. Subsequent period 308 may also be characterized by a step down function, as shown in graph 300. In some embodiments, the parameter corresponds to dynamic current for an active damper. Dynamic current corresponds to a current amount that is fluctuating in response to road feedback and is often changing to improve the overall ride experience of the user of the vehicle while traversing a road of varying conditions. Dynamic current may raise a baseline current and result in an elevated active current being applied, depending on the vehicle mode selected.

In some embodiments, a damper may have a baseline operating current for baseline operating conditions during particular drive modes and the damper may also receive increased current from an active damping aspect of a suspension system. For example, the baseline operating current during "Nominal Drive Mode" was described as 0.4 amps. An active damping system in a suspension may apply more than 0.4 amps to a particular damper (e.g., 0.6 amps), depending on a driving event that the vehicle is going through. The driving event may include driving through multiple pot holes or may require hard cornering, which may drive the active damping system to increase the damping rate of the damper at an elevated rate. As a result, the elevated change would then be applied to the active damping current level, instead of the baseline current level, to ensure the driver can perceive that a change in drive mode has occurred.

FIG. 4 is flow chart of method 400 for changing from a first vehicle setting to a second vehicle setting, in accordance with some embodiments of the disclosure. Method 400 may be executed by one or more elements of vehicle system 100 of FIG. 1 or the various assemblies and elements depicted in FIGS. 2A-2D and 5. Method 400 may result in a control signal being generated for the various elements of FIGS. 1-2D and 5 based on one or more of the graphs shown in FIG. 3 in response to an instruction to modify a vehicle operating state or a vehicle mode. Method 400 may be executed, in whole or in part, by processing circuitry 116 of FIG. 1.

At 402, a user input is monitored. If a user input is not received to change a desired vehicle mode (NO at 402), then a subsequent user input is reviewed for changing a vehicle mode. If a user input is received to change a desired vehicle mode (YES at 402), then an instruction is generated at 404 to change from a first vehicle setting to a second vehicle setting, wherein the first vehicle setting comprises a first parameter value and the second vehicle setting comprises a second parameter value. For example, one or more of a drive mode change, a suspension mode change, a steering mode change, a brake mode change, an accelerator mode change, or a powertrain mode change may be input. This input may be received via user interface 124 of FIG. 1 (e.g., to change from "Nominal Drive Mode" to "Sport Drive Mode." which may affect the parameter values for one or more of a suspension component, a steering component, a brake component, an accelerator component, or a powertrain component). Continuing from an earlier example of changing the vehicle mode from "Nominal Drive Mode" to "Sport Drive Mode." each respective mode may have different current parameter values to provide to one or more damper assemblies arranged in one or more vehicle corners (e.g., vehicle corners 102A-D of FIG. 1). At 406, in response to the instruction, an elevated change is applied to change the first vehicle parameter during an initial period (e.g., as described in reference to the various graphs of FIG. 3). The elevated change may, for example, correspond to a magnitude that is 25%-300% greater than a difference in the parameter between the first vehicle setting and the second vehicle setting. For example. "Nominal Drive Mode" may have a baseline 0.4 amps being provided to one or more dampers in a vehicle system while "Sport Drive Mode" may have a baseline of 0.6 amps being provided to one or more dampers in the vehicle system. The difference between the two parameter values is 0.2 amps. Therefore, between 0.65 amps (e.g., 0.4 amps+0.2 amps difference+25% more than the 0.2 amps difference) and 1.2 amps (0.4 amps+0.2 amps different+300% more than the 0.2 amps difference) may be applied to the initial "Sport Drive Mode" parameter value of 0.9 amps for the initial period (e.g., as defined by the initial period of FIG. 3). Once the initial period ends (e.g., when up to 10 seconds have passed), the elevated change is reduced at 408 to apply the secondar parameter value during a subsequent period. The parameter may be any parameter which may be used to generate a perceivable change for a user of a vehicle upon changing modes of any or all of the vehicle operating states associated with the user's vehicle.

Figure 5:
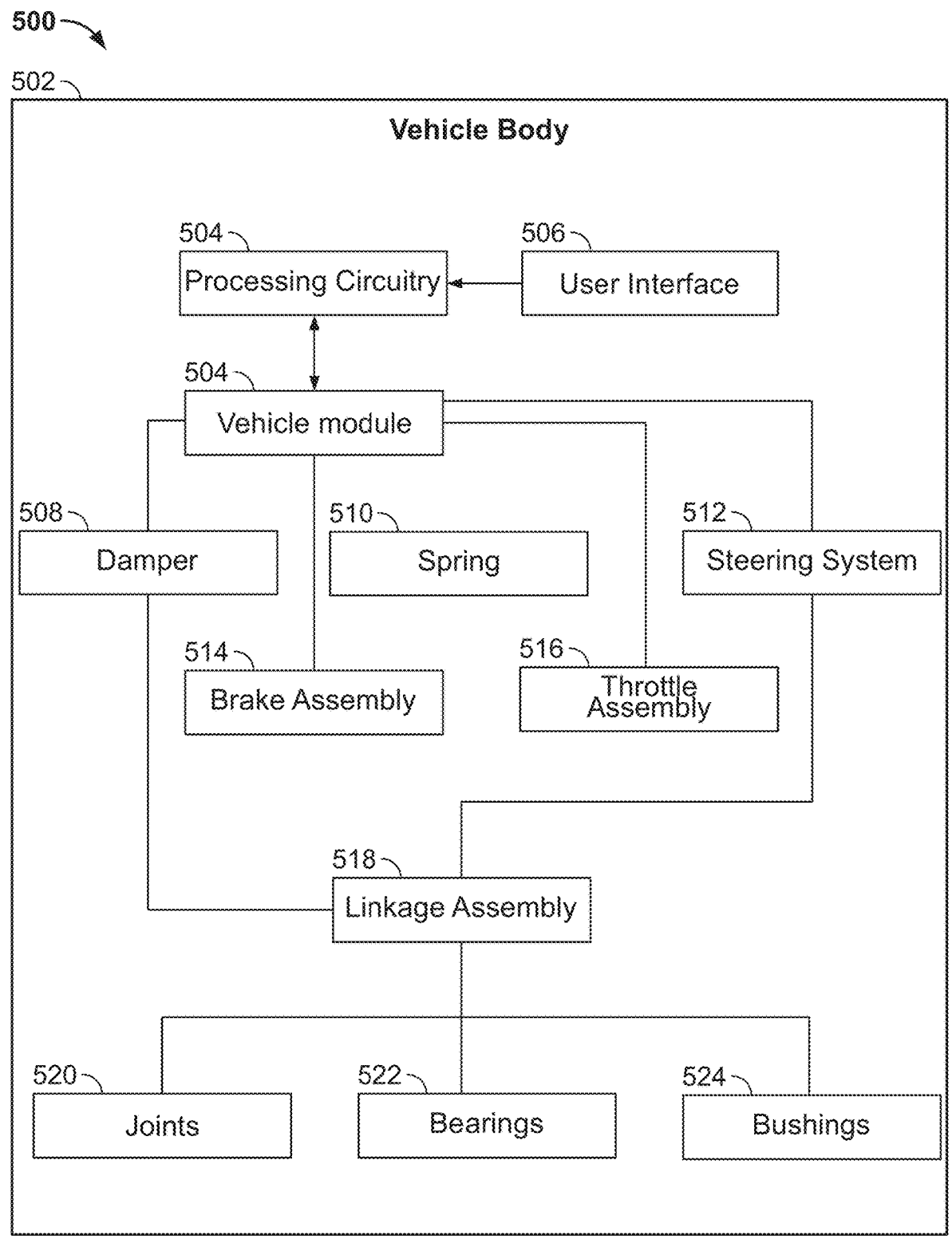
FIG. 5 is block diagram of an exemplary vehicle system, in accordance with some embodiments of the disclosure.

FIG. 5 depicts vehicle system 500, in accordance with some embodiments of the disclosure. Vehicle system 500 may incorporate, in whole or in part, the various assemblies and elements depicted in FIGS. 1-2D and 5. Vehicle system 500 may utilize one or more of the graphs of FIG. 3 as a control signal for modifying a vehicle operating state or a vehicle mode. Vehicle system 500 may be configured to execute one or more of the steps depicted in FIG. 4.

Vehicle system 500 is comprised of vehicle body 502. Arranged within vehicle body 502 are processing circuitry 504, user interface 506, and vehicle modules 504. User interface 506 may comprise one or more of the options depicted in user interface 124 of FIG. 1. User interface 506 may correspond to any input interface arranged within vehicle body 502 or communicatively coupled to vehicle body 502 (e.g., a user device or mobile device) that enables a user to input vehicle mode change requests or instructions to processing circuitry 504. Processing circuitry 504 corresponds to processing circuitry 116 of FIG. 1, and may be incorporated into vehicle body 502 in one or more locations. Processing circuitry 504 interfaces with vehicle module 504. Vehicle module 504 corresponds to one or more of front spring/damper assembly 108A, front spring damper/assembly 108B, steering system 110, brake control assembly 114, accelerator control assembly 112, rear spring/damper assembly 120A, rear spring/damper assembly 120B, or differential assembly 122. For example, vehicle module 504 may be configured to control parameters of one or more of damper 508, brake assembly 514, spring 510, throttle assembly 516 or steering system 512. Steering system 512 is coupled to linkage assembly 518. Linkage assembly 518 provides articulating connections between various components or elements of vehicle system 500. Linkage assembly 518 is comprised of one or more of joints 520, bearings 522, and bushings 524. Additionally, linkage assembly 518 includes one or more connections with damper 508 and spring 510.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Accordingly, the bounds of the claimed invention(s) should be determined from the claims and is not limited by the present disclosure. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

The following paragraphs more particularly describe various embodiments of the present disclosure.

What is claimed is:

1. A method comprising:
   generating an instruction to change from a first damper stiffness setting to a second damper stiffness setting, wherein the first damper stiffness setting comprises a first baseline current value and the second damper stiffness setting comprises a second baseline current value greater than the first baseline current value; and
   in response to the instruction:
      applying a current to an active damper during an initial period, wherein the current comprises an elevated change in current to the first baseline current value; and
      reducing the current applied to the active damper to the second baseline current value during a subsequent period after the initial period.

2. The method of claim 1, wherein the instruction is generated in response to a user selecting to change a drive mode to a sport mode.

3. The method of claim 1, wherein:
   the second damper stiffness setting corresponds to higher damper stiffness than the first damper stiffness setting.

4. The method of claim 1, wherein the active damper comprises a solenoid controlled damper.

5. The method of claim 1, further comprising:
   determining a dynamic current for the active damper; and
   selecting the higher of a baseline current and the dynamic current to apply to the active damper.

6. The method of claim 1 wherein the initial period is less than 10 seconds.

7. The method of claim 1, wherein the elevated change is 25 to 300 percent greater than a difference between the first damper stiffness setting and the second damper stiffness setting.

8. A vehicle system comprising:
   a vehicle module configured to modify operation of a vehicle based on vehicle settings; and
   processing circuitry communicatively coupled to the vehicle module, wherein the processing circuitry is configured to:
      generate an instruction to change from a first damper stiffness setting to a second damper stiffness setting, wherein the first damper stiffness setting comprises a first baseline current value and the second damper stiffness setting comprises a second baseline current value; and
      in response to the instruction:
         apply a current to an active damper during an initial period, wherein the current comprises an elevated change in current to the first baseline current value; and
         reduce the current applied to the active damper to the second baseline current value during a subsequent period after the initial period.

9. The vehicle system of claim 8, wherein the instruction is generated in response to a user selecting to change a drive mode to a sport mode.

10. The vehicle system of claim 8, wherein:
    the second damper stiffness setting corresponds to higher damper stiffness than the first damper stiffness setting.

11. The vehicle system of claim 8, wherein the active damper comprises a solenoid controlled damper.

12. The vehicle system of claim 8, wherein the processing circuitry is further configured to:
    determine a dynamic current for the active damper; and
    select the higher of a baseline current and the dynamic current to apply to the active damper.

13. The vehicle system of claim 8, wherein the initial period is less than 10 seconds.

14. The vehicle system of claim 8, wherein the elevated change is 25 to 300 percent greater than a difference between the first damper stiffness setting and the second damper stiffness setting.

15. A non-transitory computer readable medium comprising non-transitory computer readable instructions which, when processed using processing circuitry, causes the processing circuitry to:
    generate an instruction to change from a first damper stiffness setting to a second damper stiffness setting, wherein the first damper stiffness setting comprises a first baseline current value and the second damper stiffness setting comprises a second baseline current value; and in response to the instruction:
   apply a current to an active damper during an initial period, wherein the current comprises an elevated change in current to the first baseline current value; and
   reduce the current applied to the active damper to the second baseline current value during a subsequent period after the initial period.

16. The non-transitory computer readable medium of claim 15, wherein the elevated change is 25 to 300 percent greater than a difference between the first damper stiffness setting and the second damper stiffness setting.

* * * * *